United States Patent [19]

Credelle

[11] 4,121,137
[45] Oct. 17, 1978

[54] SYSTEM FOR ACHIEVING IMAGE UNIFORMITY IN DISPLAY DEVICES

[75] Inventor: Thomas Lloyd Credelle, East Windsor, N.J.

[73] Assignee: RCA Corporation, New York, N.Y.

[21] Appl. No.: 741,403

[22] Filed: Nov. 12, 1976

[51] Int. Cl.² .................... H01J 29/70; H01J 29/72
[52] U.S. Cl. ................................. 315/366; 315/383; 358/168; 358/219
[58] Field of Search ............... 315/366, 383, 30; 313/422; 358/219, 168, 169

[56] References Cited

U.S. PATENT DOCUMENTS

| | | | |
|---|---|---|---|
| 3,644,669 | 2/1972 | Slavik | 315/383 X |
| 3,882,359 | 5/1975 | Secher | 315/383 |
| 3,995,197 | 11/1976 | Caswell | 315/383 |

Primary Examiner—Theodore M. Blum
Attorney, Agent, or Firm—E. M. Whitacre; G. H. Bruestle; G. E. Haas

[57] ABSTRACT

Each beam of a multi-electron beam display device is controlled to achieve uniformity of the displayed image. A collector senses the electron current of each beam. The level of the electron current of each beam is stored in a memory. When a particular beam is to be modulated, the memory is addressed so that the electron current level information for that beam is read out. The stored information and the incoming image element brightness information are combined to modulate the particular electron beam.

8 Claims, 4 Drawing Figures

SYSTEM FOR ACHIEVING IMAGE UNIFORMITY IN DISPLAY DEVICES

BACKGROUND OF THE INVENTION

The present invention relates to multi-electron beam image display devices and more particularly to means for achieving image brightness uniformity in such devices.

Recently many display devices have been suggested utilizing a plurality of electron beams, each of which illuminates a separate region of the entire display. One of the difficulties encountered in the use of separate electron beams for different portions of the display is that each beam will vary in terms of its electron current. This variation causes nonuniformity in the brightness of the displayed image. In order for such displays to be practical, the image must have a uniform brightness.

SUMMARY OF THE INVENTION

In a multi-electron beam display device, the electron current of each beam is sensed by a collector. Information relating to the level of the sensed electron current for each beam is stored in a memory. The beams are then modulated using the stored information and brightness information from the image signal.

DETAILED DESCRIPTION OF THE PREFERRED EMBODIMENT

Figure 1:
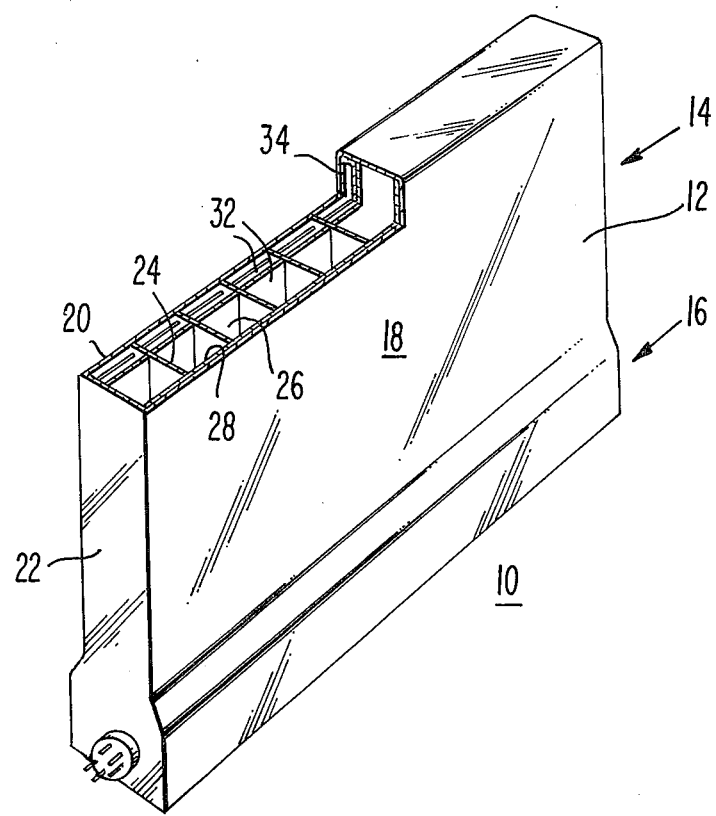
FIG. 1 is a partial cut-away section of a multi-electron beam display device.

Referring to FIG. 1, one form of flat display of the present invention is generally designated as 10. The display device 10 comprises an evacuated envelope 12 typically of glass, having a display section 14 and an electron gun section 16. The display section 14 includes a rectangular front wall 18 which supports the viewing screen and a rectangular back wall 20 in a spaced parallel relation with the front wall 18. The front wall 18 and the back wall 20 are connected by sidewalls 22. The front and back walls 18 and 20 respectively, are dimensioned to provide the size of the viewing screen desired, e.g. 75 by 100 cm., and are spaced apart about 2.5 to 7.5 cm.

A plurality of spaced, parallel walls 24 are secured between the front wall 18 and back wall 20 extending from the gun section 16 to the opposite sidewall 22. The support walls 24 provide the desired internal support for the evacuated envelope 12 against external atmospheric pressure and divide the display section 14 into a plurality of channels 26. On the inner surface of the front wall 18 is a phosphor screen 28. The phosphor screen may be of any well known type presently used on cathode ray tubes, e.g., black and white or color television display tubes. In a color display, the phosphor in the channel 26 alternates between red, green and blue phosphor.

The gun section 16 is an extension of the display section 14 and extends along one set of adjacent ends of the channels 26. The gun section 16 may be of any shape suitable to enclose the particular gun structure contained therein. The electron gun structure contained in the gun section 16 may be of any well known construction suitable for selectively directing beams of electrons along each of the channels 26. For example, a gun structure may comprise a plurality of individual guns mounted at the ends of the channels 26 for directing separate beams of electrons along the channels. Alternatively, the gun structure may include a line cathode extending along the gun section 16 across the adjacent channels 26 and adapted to selectively direct individual beams of electrons along the channel. The gun structure of this type is described in U.S. Pat. No. 2,858,464, issued to W. L. Roberts on Oct. 28, 1958 entitled "CATHODE RAY TUBE."

A plurality of focusing guides 32 are in each of the channels 26 for confining the electrons from the gun into a beam, which travels a path along the channel. Each guide also includes means for deflecting its beam out of the guide through one of a plurality of small apertures in the focusing guides 32 and toward the phosphor screen 28 at various points along the length of the channel 26. At the end of the channels 26 remote from the gun section 16 is an electron collector 34 between the focusing guides 32. The collector 34 is a U-shaped electrode which extends the full width of the device 10 across the ends of the channels.

Figure 2:
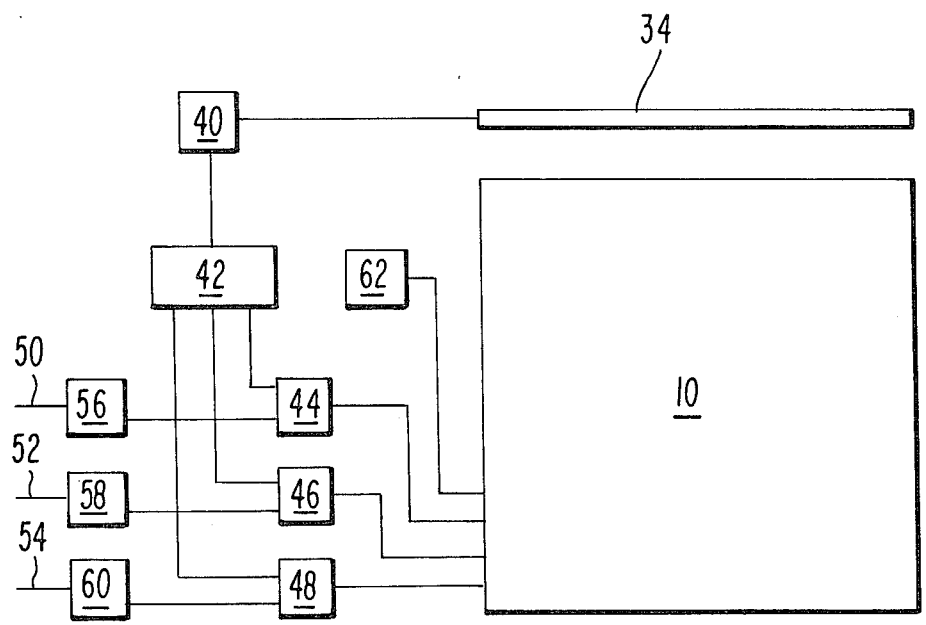
FIG. 2 is a block diagram of a circuit for equalizing each of the electron beams in the display.

As shown in FIG. 2 the collector 34 is connected to a collector analog to digital (A/D) converter 40. The output of the collector analog to digital converter is connected to the input of a digital memory 42 such as a random access memory. The memory 42 has sufficient storage locations to store a word of information for each of the electron channels 26. The output of the memory is connected to one of three digital dividers 44, 46 and 48. Three signals representing the brightness information for each of the colors (red, green and blue) of the display, are fed into separate brightness A/D converters 56, 58 or 60; the outputs of which are connected to input of one of the three digital dividers 44, 46 or 48. The output from each of the digital dividers is connected to the electron gun control circuits in the gun section 16.

The gun control circuits may vary depending on the specific display system employed. For example, if an entire line of the image is to be displayed simultaneously, the gun control circuit would store the brightness signals for all the elements in a line. In this case, the brightness signals are fed into a first memory during the active line time. Then during the horizontal retrace time, the contents of the first memory are transferred to a second memory. During the next active line time the contents of the second memory are converted to analog signals that are applied to the modulator electrodes of each gun while the first memory is updated with the brightness signals for the next line. A reference brightness signal generator 62 is connected to the gun control circuits.

The basic display as shown in FIGS. 1 and 2 has been proposed for image display purposes such as television, using the NTSC standard. A separate electron beam for each image element in the display line travels from the gun section 16 up the channel 26 between the focusing guides 32. When the beam has reached the height of the image element to be illuminated on the screen 28, the beam is deflected through the proper aperture 36 in the focusing guide 32. This is accomplished by negatively biasing an electrode on the back wall 20. The beam then strikes the phosphor sceen 28. The image brightness is controlled by varying the length of time that the beam strikes the screen. The beams in all of the channels 26 may be sequentially or simultaneously activated to display a line of the display image on the screen, depending on the type of gun control circuitry in the gun section 16 of the display.

The present invention provides means for compensating for non-uniform electron beams so that the image will have uniform brightness. This is generally accomplished by sensing the current for each electron beam and storing the current level in a memory. When a particular beam is to be used to excite an image element, the store current level is read out and divided into the image element brightness signal. The quotient is then fed to the gun control for that channel as the equalized brightness signal.

When the display is turned on but before information is displayed, each of the electron guns is individually activated by applying a test image brightness signal from generator 62 to its corresponding gun control circuit. An electron beam is generated in each of the channels 26, travels the entire length of the channel 26 and strikes the collector 34 without being deflected toward the phosphor screen 28. The electron beam striking the collector 34 generates an electrical voltage. The voltage is translated into a five or six bit digital word by the collector A/D converter 40. The digital word is then stored in memory 42 in a location which corresponds to the electron gun which has been activated. This process then is repeated for all of the electron guns in the display.

Once the electron current information for each of the electron guns has been stored in the memory, the device is then ready to display an image. When the image is to be displayed, the composite brightness signal is separated into a signal for each color as in conventional television systems. The separate signals are simultaneously fed on lines 50, 52 and 54 to the respective brightness A/D converter 56, 58 or 60 where they are translated into a digital word and sent to the dividers 44, 46 and 48. At the same time, the electron current information stored in the memory 42 is read out and fed to the three dividers 44, 46 and 48. The dividers 44, 46, and 48 may be read only memories used as look up tables, where the electron current information and the brightness signal addresses a memory location containing the quotient. The stored quotient may already have gamma correction. The sequence of the memory read out matches that of each of the brightness signals so that the electron current information for a given channel 26 appears at the divider synchronized with the brightness signal for that channel. The dividers divide the brightness signal by the electron current information to generate an equalized brightness signal, which is sent to the various gun control circuits. The equalized brightness signal compensates for the nonuniformity of the electron guns.

After the last line of video information has been displayed, the display is turned off as in conventional cathode ray tubes for the duration of the vertical retrace time. During this time, test signals are applied to the electron guns and the memory 42 is updated with new electron current information for each of the guns of the display. This updating of the electron current information may occur less frequently than every retrace time, for example, only a portion of the memory 42 may be updated during each retrace. The updating of the memory compensates for the variations due to the temperature of the gun with time and other aging characteristics.

Figure 3:
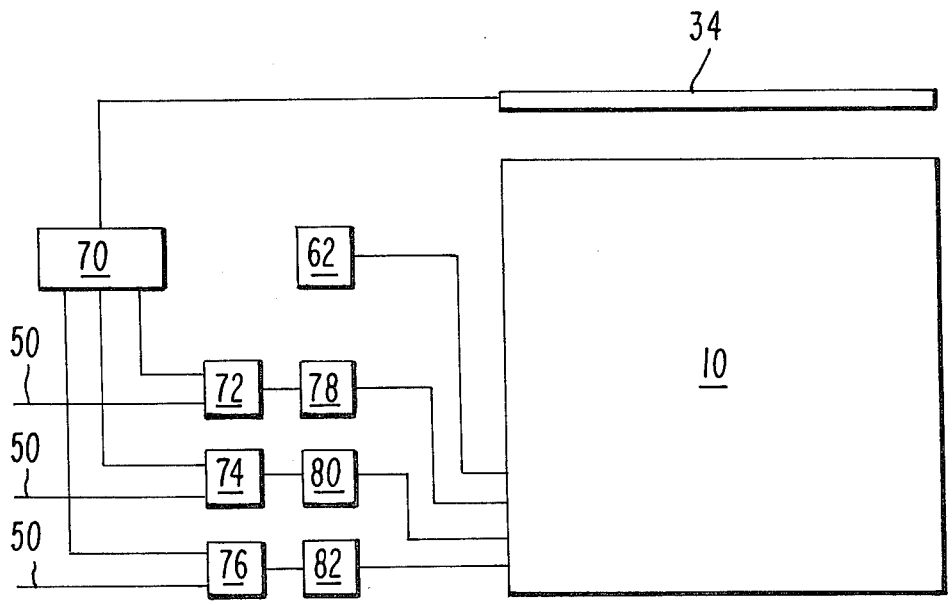
FIG. 3 is an alternate circuit for equalizing the electron beams.

FIG. 3 shows an alternate system for making an image of the multi-electron beam display device more uniform. The output of the collector 34 is fed to a charge coupled device (CCD) memory 70. Means for feeding the stored information back into the CCD memory must be provided so that the memory is not erased as the information is read out. The output of the CCD memory 70 is fed into three analog dividers 72, 74 and 76. The other input of each of the dividers 72, 74 and 76 is connected to the image brightness information for the proper color red, green or blue. The output of each of the dividers is connected to a separate A/D converter having its output coupled to the electron guns. The alternate system shown in FIG. 3 operates substantially the same way as the previously described system in FIG. 2 except that division is analog rather than digital. The electron current from each of the guns is stored in the memory 70. At the proper time this electron current information is read out of the memory, divided into the incoming image brightness signal and then converted to a digital signal to be processed by the gun control circuts.

Figure 4:
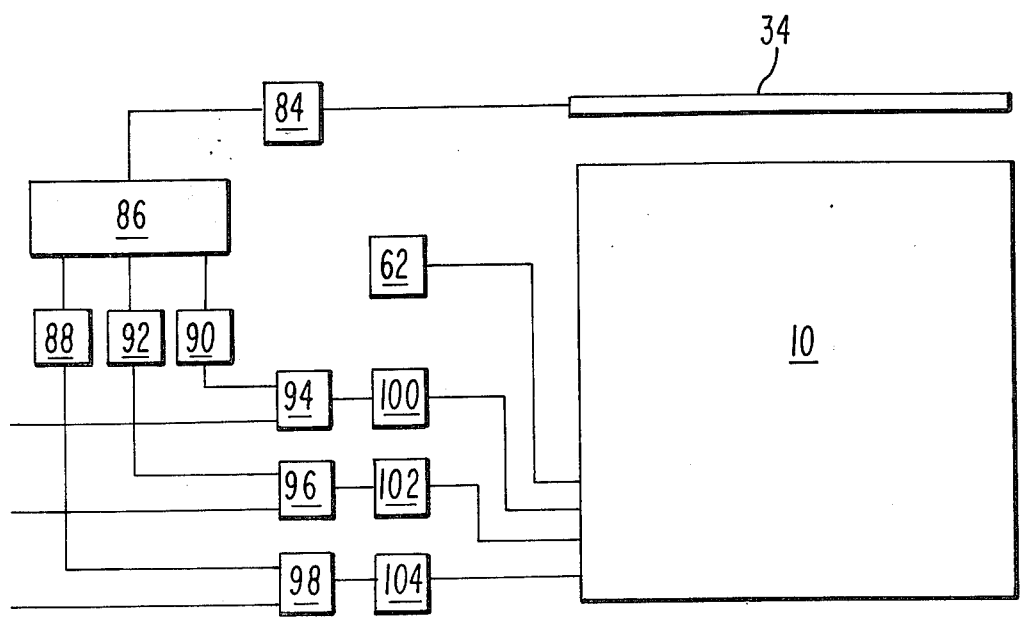
FIG. 4 is another alternate circuit for equalizing the electron beams.

Another alternate system is shown in FIG. 4. The collector 34 is connected to a collector A/D converter 84. A memory 86 stores the converted signal from the collector A/D converter 84. The output of the memory 86 is fed to three D/A converters 88, 90 and 92. Each D/A converter 88, 90 and 92 is connected to a separate analog divider circuit 94, 96 or 98. Three brightness A/D converters 100, 102 and 104 have their inputs connected to a different divider 94, 96 or 98 and their outputs are connected to the gun control circuits. A reference signal generator 62 is also connected to the gun control circuits. This system operates in essentially the same manner as the one in FIG. 2 except that it combines a digital memory with analog signal division.

From the description herein, other variations of the present system are obvious. In a monochrome display device where there is only one brightness signal, it is readily apparent that only one A/D converter and only one divider would be required. Other collector configurations may also be used. For example, multiple collectors, each extending over a portion of the display, can be used to update the memory 42 in a parallel fashion. An additional variation would be to connect a divider between the collector and the memory to divide the sensed beam current information into one, i.e. to form the electrical reciprocal of the sensed information. A multiplier then can be used in place of the divider to combine the stored information with the image brightness signal.

I claim:

1. A system for achieving brightness uniformity in an image display device having a plurality of electron beams modulatd by a brightness signal, said system comprising:
    means for sensing the electron current of each electron beam with an electron collector upon which the electron beams impinge;
    means for storing the sensed electron beam current information; and
    means for modifying the brightness signal in response to the stored electron beam current information so as to compensate for non-uniform electron beam currents.

2. The system as in claim 1 wherein the modifying means comprises:
   a divider between the sensing means and the memory; and
   a multiplier for multiplying the incoming image brightness signal by the stored electron beam current information.

3. The system as in claim 1 wherein the storage means comprises:
   a digital random access memory; and
   a first analog to digital converter between the collector and the memory.

4. The system as in claim 3 wherein the modifying means further comprises:
   a second analog to digital converter on each line of incoming image brightness information; and
   a divider connected to each analog to digital converter for dividing the brightness information by the electron beam current information from the storage means.

5. The system as in claim 1 wherein the storing means comprises a charge coupled device memory.

6. The system as in claim 5 wherein the modifying means comprises an analog divider for dividing the stored electron beam current information into the incoming image brightness information.

7. The system as in claim 6 further comprising an analog to digital converter connected to the output of the analog divider.

8. A method for achieving image uniformity in a multielectron beam display device comprising:
   sensing the electron current in each beam with an electron collector upon which the electron beams impinge;
   storing in a memory information relating to the level of electron current in each beam; and
   modulating each electron beam by combining the electron current information for a given beam with the image brightness signal for that beam so as to compensate for non-uniformity among the beams.

* * * * *